United States Patent
Zhou

(10) Patent No.: US 9,245,101 B2
(45) Date of Patent: Jan. 26, 2016

(54) ELECTRONIC DEVICE AND UNLOCKING METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jian-Jun Zhou, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 34 days.

(21) Appl. No.: 14/159,405

(22) Filed: Jan. 20, 2014

(65) Prior Publication Data

US 2014/0245432 A1    Aug. 28, 2014

(30) Foreign Application Priority Data

Feb. 28, 2013  (CN) .......................... 2013 1 0063523

(51) Int. Cl.
G06F 21/32     (2013.01)
G06F 3/0488    (2013.01)
G06F 21/36     (2013.01)

(52) U.S. Cl.
CPC ............ *G06F 21/32* (2013.01); *G06F 3/04883* (2013.01); *G06F 21/36* (2013.01)

(58) Field of Classification Search
CPC ...... G06F 21/32; G06F 3/04883; G06F 21/36
USPC .......................................................... 726/19
See application file for complete search history.

(56) References Cited

U.S. PATENT DOCUMENTS

| | | | |
|---|---|---|---|
| 2009/0284482 A1* | 11/2009 | Chin | 345/173 |
| 2012/0036556 A1* | 2/2012 | LeBeau et al. | 726/3 |
| 2013/0027184 A1* | 1/2013 | Endoh | 340/5.83 |
| 2013/0086673 A1* | 4/2013 | Putterman et al. | 726/19 |
| 2013/0219490 A1* | 8/2013 | Isbister et al. | 726/19 |
| 2013/0285925 A1* | 10/2013 | Stokes et al. | 345/173 |
| 2014/0002410 A1* | 1/2014 | Lillie et al. | 345/174 |

* cited by examiner

*Primary Examiner* — Carl Colin
*Assistant Examiner* — Don Zhao
(74) *Attorney, Agent, or Firm* — Novak Druce Connolly Bove + Quigg LLP

(57) ABSTRACT

An electronic device includes a touch screen. When the electronic device wakes up and works in a locked state, a notification interface including a predetermined unlocking area is displayed on the touch screen. A user pattern formed by at least two fingers of a user located within the predetermined unlocking area is detected. The electronic device is unlocked if the user pattern matches a predetermined unlocking pattern.

10 Claims, 3 Drawing Sheets

ELECTRONIC DEVICE AND UNLOCKING METHOD THEREOF

BACKGROUND

1. Technical Field

Embodiments of the present disclosure relate to unlocking of electronic devices, and particularly, to an unlocking method of an electronic device.

2. Description of Related Art

Many electronic devices, such as smart phones and tablet computers, have locking functions to avoid unintended operations. Current unlocking methods include unlocking by gestures, passwords, and patterns, which are tedious. Therefore, an improved unlocking method of the electronic devices is needed.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
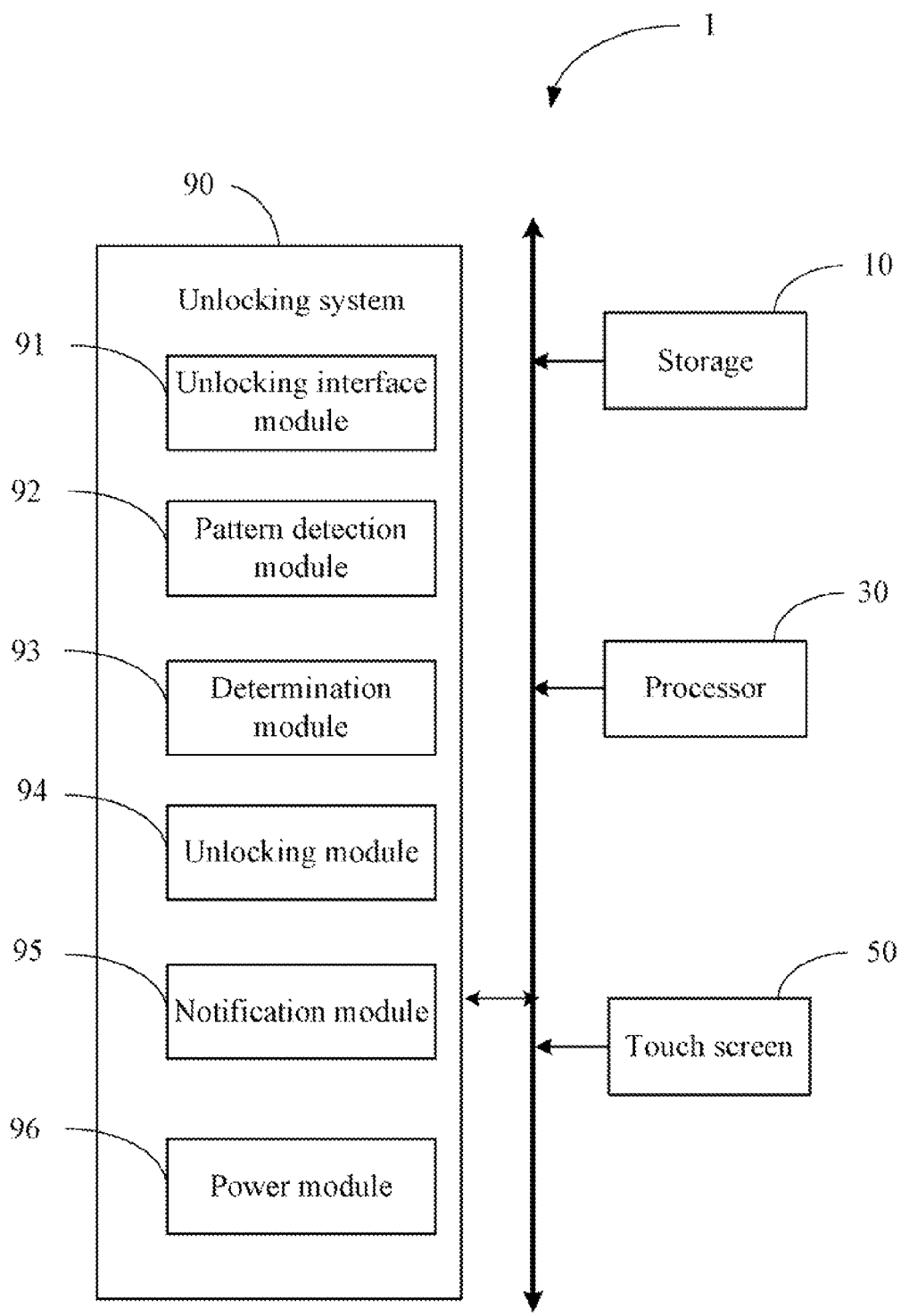
FIG. 1 is a schematic block diagram illustrating one embodiment of an electronic device.

FIG. 1 is a schematic block diagram illustrating one embodiment of an electronic device 1. The electronic device 1 includes a storage 10, a processor 30, a touch screen 50, and an unlocking system 90. The electronic device 1 can be, for example, a smart phone, a tablet computer, a mobile Internet device (MID), or other similar device. FIG. 1 shows one embodiment of the electronic device 1, and it can include more or fewer components than those shown in the embodiment, or have a different configuration of the components.

The unlocking system 90 can include a plurality of programs in the form of one or more computerized instructions stored in the storage 10 and executed by the processor 30 to perform operations of the electronic device 1. In the embodiment, the unlocking system 90 includes an unlocking interface module 91, a pattern detection module 92, a determination module 93, an unlocking module 94, a notification module 95, and a power module 96. The storage 10 can be an external or embedded storage medium of the electronic device 1, such as a secure digital memory (SD) card, a Trans Flash (TF) card, a compact flash (CF) card, or a smart media (SM) card.

In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

Figure 3:
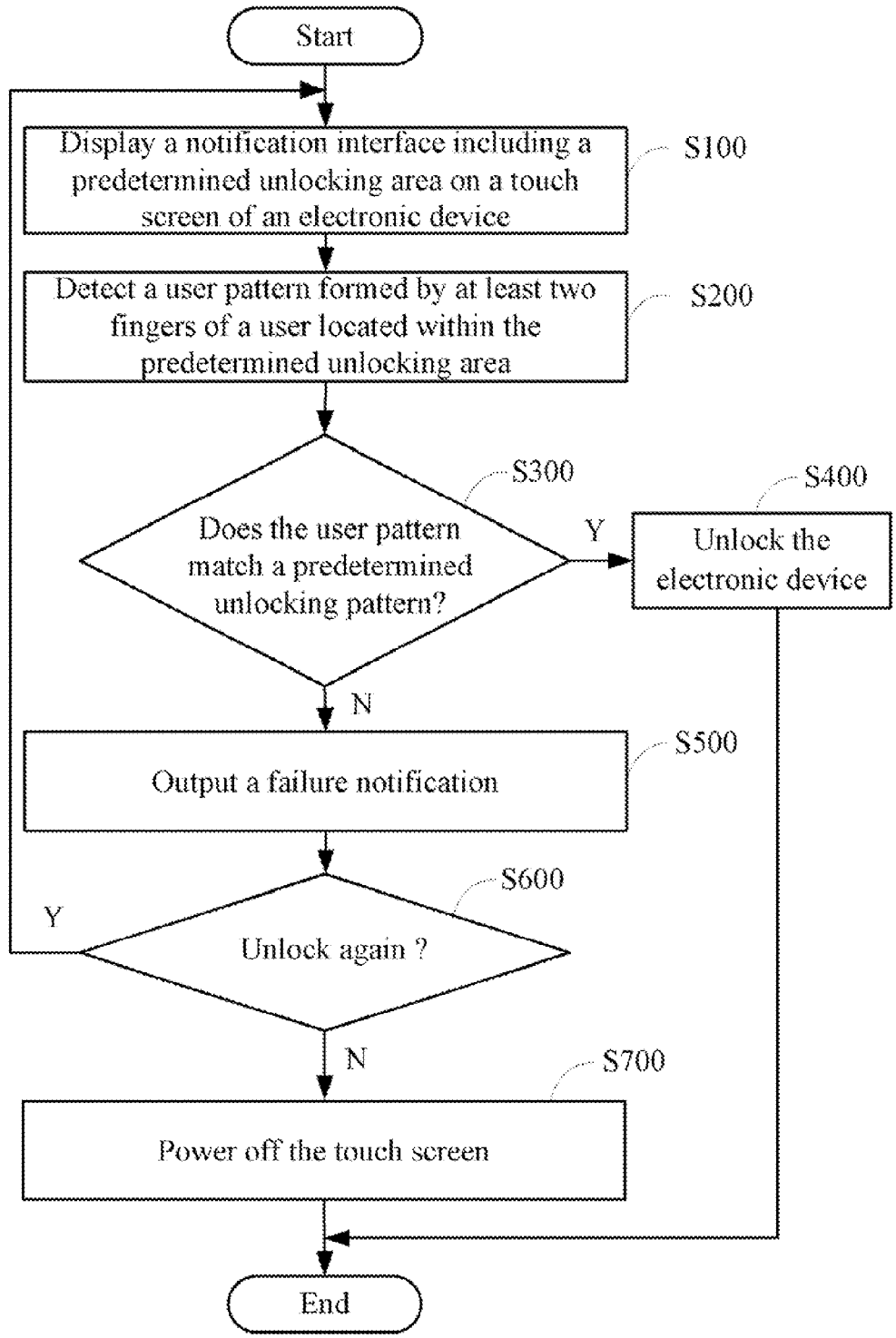
FIG. 3 is a flowchart of one embodiment of an unlocking method of the electronic device of FIG. 1.

FIG. 3 shows a flowchart of one embodiment of an unlocking method of the electronic device 1 of FIG. 1. Depending on the embodiment, additional steps may be added, others removed, and the ordering of the steps may be changed.

Figure 2:
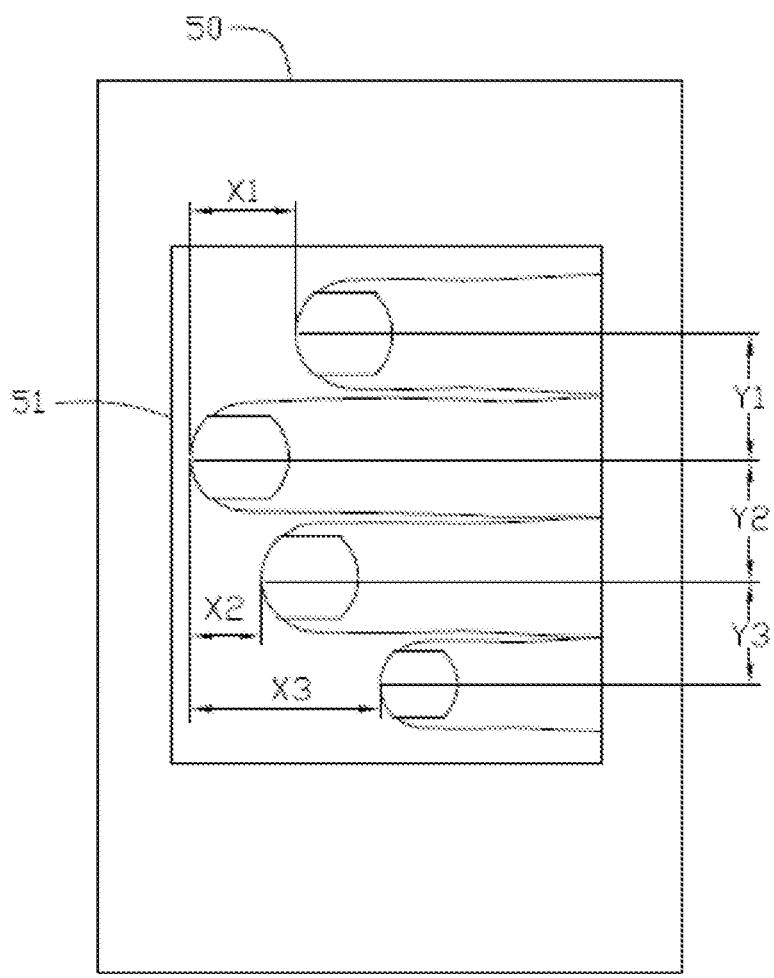
FIG. 2 shows schematic view of a pattern formed when at least two fingers of a user are touched on a touch screen of the electronic device of FIG. 1.

In step S100, when the electronic device 1 wakes up and works in a locked state, the unlocking interface module 91 displays a notification interface on the touch screen 50. The notification interface includes a predetermined unlocking area 51 as shown in FIG. 2.

In step S200, the pattern detection module 92 detects a pattern formed by at least two fingers of a user located within the predetermined unlocking area 51. In this embodiment, the fingers are adjacent fingers of the same hand of the user. When the electronic device 1 wakes up and works in a locked state, the user can contact the predetermined unlocking area 51 of the touch screen 50 using at least two adjacent fingers (e.g., forefinger and middle finger) to unlock the electronic device 1. The pattern detection module 92 detects a user pattern formed on the predetermined unlocking area 51 of the touch screen 50 by the at least two adjacent fingers.

In step S300, the determination module 93 determines whether the user pattern matches a predetermined unlocking pattern. If the user pattern matches the predetermined unlocking pattern, step S400 is implemented. Otherwise, step S500 is implemented.

In one embodiment, the predetermined unlocking pattern is stored in the storage 10 and includes at least two fingers of the user. When the user pattern is detected by the pattern detection module, the determination module 93 first calculates a length difference between a longest finger of the user pattern and each of the other fingers of the user pattern. If the calculated length difference between the longest finger of the user pattern and each of the other fingers of the user pattern is the same or approximately the same as a length difference between a longest finger of the predetermined unlocking pattern and each of the other fingers of the predetermined unlocking pattern, the determination module 93 determines that the user pattern matches the predetermined unlocking pattern. In this embodiment, the length difference between the longest finger of the predetermined unlocking pattern and each of the other fingers of the predetermined unlocking pattern is calculated and stored in the storage 10.

FIG. 2 shows the user pattern includes a forefinger, a middle finger, a ring finger, and a little finger of the user. The middle finger is typically the longest finger of the user pattern. A length difference between the middle finger and the forefinger is defined to be X1, a length difference between the middle finger and the ring finger is defined to be X2, and a length difference between the middle finger and the little finger is defined to be X3. The predetermined unlocking pattern includes a stored middle finger, a stored forefinger, a stored ring finger, and a stored little finger. A length difference between the stored middle finger and the stored forefinger is defined to be X1', a length difference between the stored middle finger and the stored ring finger is defined to be X2', and a length difference between the stored middle finger and the stored little finger is defined to be X3'. In one embodiment, if X1 is substantially equal to X1', X2 is substantially equal to X2', and X3 is substantially equal to X3', the user pattern is determined to match the predetermined unlocking pattern. In another embodiment, if the absolute value of a difference between X1 and X1', a difference between X2 and X2', and a difference between X3 and X3' are each less than a predetermined tolerance value (e.g., 3 millimeter), the user pattern is determined to match the predetermined unlocking pattern.

In another embodiment, the determination module 93 first calculates a distance between central horizontal crossing lines of each two adjacent fingers of the user pattern. If the calculated distance between the central horizontal crossing lines of each two adjacent fingers of the user pattern is the same or approximately the same as a distance between central horizontal crossing lines of each two adjacent fingers of the predetermined unlocking pattern, the determination module 93 determines that the user pattern matches the predetermined unlocking pattern. For example, as shown in FIG. 2, a distance between a central horizontal crossing line of the middle finger and a central horizontal crossing line of the forefinger is defined to be Y1, a distance between the central horizontal crossing line of the middle finger and a central horizontal crossing line of the ring finger is defined to be Y2, and a distance between the central horizontal crossing line of the ring finger and a central horizontal crossing line of the little finger is defined to be Y3. A distance between a central horizontal crossing line of the stored middle finger of the predetermined unlocking pattern and a central horizontal crossing line of the stored forefinger is defined to be Y1', a distance between the central horizontal crossing line of the stored middle finger and a central horizontal crossing line of the stored ring finger is defined to be Y2', and a distance between the central horizontal crossing line of the stored ring finger and a central horizontal crossing line of the stored little finger is defined to be Y3'. In one embodiment, if Y1 is substantially equal to Y1', Y2 is substantially equal to Y2', and Y3 is substantially equal to Y3', the detected pattern is determined to match the predetermined unlocking pattern. In another embodiment, if the absolute value of a difference between Y1 and Y1', a difference between Y2 and Y2', and a difference between Y3 and Y3' are each less than the predetermined tolerance value (e.g., 3 millimeter), the detected pattern is determined to match the predetermined unlocking pattern.

In step S400, the unlocking module 94 unlocks the electronic device 1, and then the procedure ends.

In step S500, the notification module 95 controls the electronic device 1 to output a failure notification (e.g., voices or texts) to notify the user the unlocking operation to the electronic device 1 failed.

In step S600, the unlocking interface module 91 notifies the user to select whether to try to unlock the electronic device 1 again. If the user selects to try to unlock the electronic device 1 again, the procedure goes back to step S100. Otherwise, step S700 is implemented.

In step S700, the power module 96 powers off the touch screen 50 of the electronic device 1, and the electronic device 1 is in an idle state.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized unlocking method of an electronic device having a touch screen, the method comprising:
    displaying a notification interface including a predetermined unlocking area on the touch screen when the electronic device wakes up and works in a locked state;
    detecting a user pattern formed by at least two fingers of a user located within the predetermined unlocking area;
    determining whether the user pattern matches a predetermined unlocking pattern; and
    unlocking the electronic device when the user pattern matches the predetermined unlocking pattern;
    wherein determining whether the user pattern matches a predetermined unlocking pattern comprises:
        calculating at least one length difference between a longest finger of the user pattern and at least one of the other fingers of the user pattern; and
        determining whether the user pattern matches the predetermined unlocking pattern according to the calculated at least one length difference between the longest finger of the user pattern and at least one of the other fingers of the user pattern and at least one length difference between a longest finger of the predetermined unlocking pattern and at least one the other fingers of the predetermined unlocking pattern.

2. The method according to claim 1, wherein the user pattern is determined to match the predetermined unlocking pattern when an absolute value of a difference between the calculated at least one length difference between the longest finger of the user pattern and the at least one of the other fingers of the user pattern and the at least one length difference between the longest finger of the predetermined unlocking pattern and at least one of the other fingers of the predetermined unlocking pattern is less than a predetermined tolerance value.

3. The method according to claim 1, the predetermined unlocking pattern is stored in a storage of the electronic device and comprises at least two fingers.

4. The method according to claim 1, further comprising:
    controlling the electronic device to output a failure notification to notify the user the unlocking operation to the electronic device failed if the pattern that matches the predetermined unlocking pattern is not detected within the predetermined time period.

5. The method according to claim 1, further comprising:
    notifying the user to select whether to unlock the electronic device again; and
    powering off the touch screen of the electronic device to make the electronic device work in an idle state if the user does not select to unlock the electronic device again.

6. An electronic device, comprising:
    a touch screen;
    a storage;
    a processor; and
    one or more programs executed by the processor to:
    display a notification interface including a predetermined unlocking area on the touch screen when the electronic device wakes up and works in a locked state;
    detect a user pattern formed by at least two fingers of a user located within the predetermined unlocking area;
    determine whether the user pattern matches a predetermined unlocking pattern; and
    unlock the electronic device when the user pattern matches the predetermined unlocking pattern;
    wherein the processor determines whether the user pattern matches the predetermined unlocking pattern by:
        calculating at least one length difference between a longest finger of the user pattern and at least one of the other fingers of the user pattern; and
        determining whether the user pattern matches the predetermined unlocking pattern according to the calculated at least one length difference between the longest finger of the user pattern and at least one of the other fingers of the user pattern and at least one length difference between a longest finger of the predetermined unlocking pattern and at least one the other fingers of the predetermined unlocking pattern.

7. The electronic device according to claim 6, wherein the user pattern is determined to match the predetermined unlocking pattern when an absolute value of a difference between the calculated at least one length difference between the longest finger of the user pattern and the at least one of the other fingers of the user pattern and the at least one length difference between the longest finger of the predetermined unlocking pattern and at least one of the other fingers of the predetermined unlocking pattern is less than a predetermined tolerance value.

8. The electronic device according to claim 6, the predetermined unlocking pattern is stored in the storage of the electronic device and comprises at least two fingers.

9. The electronic device according to claim 6, wherein the one or more programs executed by the processor to further:
   control the electronic device to output a failure notification to notify the user the unlocking operation to the electronic device failed if the pattern that matches the predetermined unlocking pattern is not detected within the predetermined time period.

10. The electronic device according to claim 6, wherein the one or more programs executed by the processor to further:
   notify the user to select whether to unlock the electronic device again; and
   power off the touch screen of the electronic device to make the electronic device work in an idle state if the user does not select to unlock the electronic device once again.

* * * * *